(12) United States Patent
Vinnakota

(10) Patent No.: US 8,050,204 B2
(45) Date of Patent: Nov. 1, 2011

(54) CONCENTRIC RINGS WIRELESS NETWORK ARCHITECTURE

(75) Inventor: Bapiraju Vinnakota, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1040 days.

(21) Appl. No.: 11/900,078

(22) Filed: Sep. 10, 2007

(65) Prior Publication Data

US 2009/0067393 A1  Mar. 12, 2009

(51) Int. Cl.
*H04W 4/00* (2009.01)

(52) U.S. Cl. .................. 370/310; 370/338; 455/443

(58) Field of Classification Search .................. None
See application file for complete search history.

(56) References Cited

U.S. PATENT DOCUMENTS

| | | | |
|---|---|---|---|
| 2005/0108374 A1* | 5/2005 | Pierzga et al. | 709/223 |
| 2006/0203746 A1* | 9/2006 | Maggenti et al. | 370/254 |
| 2006/0217132 A1* | 9/2006 | Drummond-Murray et al. | 455/456.2 |

* cited by examiner

*Primary Examiner* — Chirag Shah
*Assistant Examiner* — Salvador E Rivas

(57) ABSTRACT

A wireless network includes access points arranged in concentric rings and grids of concentric rings. At low network loads, only access points in the center are on to reduce power consumption. As network loads increase, access points in concentric rings are turned on. As network loads decrease, access points in concentric rings are turned off.

11 Claims, 4 Drawing Sheets

CONCENTRIC RINGS WIRELESS NETWORK ARCHITECTURE

FIELD

The present invention relates generally to wireless networks, and more specifically to energy savings in wireless networks with multiple access points.

BACKGROUND

Wireless local area networks (WLANs) provide network connectivity to wireless clients in a target area. Current WLANs typically include multiple access points (APs) connected together by switches that create a wired backhaul network. When multiple access points (APs) are used, each AP typically provides wireless coverage to a fixed subset of the target area. Conversely, a spot in the coverage area is typically always serviced by the same set of APs. A client serviced by the network is associated with a specific AP, typically the topologically closest AP, however clients may associate with an AP that is not the topologically nearest AP to receive a better quality of service.

In current WLAN architectures, networks are typically operated with all APs either on or in a standby mode. For example, even at low user loads, every AP is typically either on while supporting a small number of users, or in a standby mode (still dissipating power) to support users that may enter its coverage area. Consequently, all the switches in the wired backhaul network are also typically always on. Both factors keep power dissipation high even when there is no load or light load on a wireless network.

DESCRIPTION OF EMBODIMENTS

Figure 1:
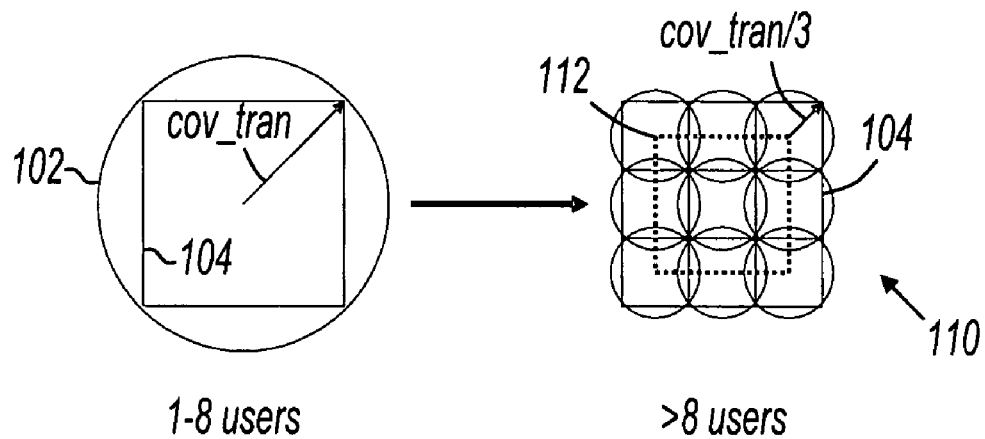
FIGS. 1 and 2 show diagrams of access point coverage in a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of access point coverage in a wireless network in accordance with various embodiments of the present invention. An AP covers (provides connectivity to) clients (stations) within a certain coverage area, usually modeled by a circle centered at the AP. The range of the AP, directly controlled by modulating the transmit power, is the radius of the circle modeling the coverage. The capacity of the AP is the number of users that it can support. We refer to this capacity number as k_ap. In some examples below, a value of 8 is used for k_ap, although this is not a limitation of the present invention. Various values for k_ap may be used in different network architecture deployments.

Given a transmit range cov_tran, the coverage is normally modeled by a circle 102 of radius cov_tran. Assume a target area 104 small enough to be covered by a single AP when placed at its center. Now assume that the network needs to support more than k_ap (the capacity of a single AP) users. The same area can now be covered with multiple APs 110, each with a smaller coverage area as follows. The target area is tiled into nine squares inside circles of radius length (cov_tran/3). An AP is placed at the center of each circle. The outer APs form a concentric ring around the original AP. The capacity of the network in the target area increases from k_ap to 9k_ap. This network can adapt to the actual user load as follows.

When the number of users in the target area is less than or equal to k_ap, the single AP at the center provides coverage for the target area. All clients are associated with the center AP. The APs in the concentric ring are turned off. When the number of users exceeds k_ap, the APs at the concentric ring are powered on. The coverage area of the original AP is reduced to one ninth its original value. Each client is associated with the topologically closest AP. Some clients may have to be re-associated.

The orientation of APs 110 is referred to as a "concentric center ring architecture" or "concentric ring architecture." The original AP is placed at the center, and the eight additional APs have centers that form a ring concentric with the original AP. Concentric rings may be adaptively turned on or off based on network load. The adaptation is based on exploiting the ability to dynamically alter the coverage area of an AP by modulating the transmit power. At light network loads, one or more concentric rings of APs may be turned off, and a small subset of APs may be left on with large coverage areas.

By turning many APs off, many switches in the infrastructure may also be turned off to reduce power dissipation. For example, the access points in the concentric ring may be connected together by a network switch that is not connected to the center AP. This is shown by the dashed line at 112. When the outer ring of APs is off, the network switch represented by dashed line 112 may also be off.

Concentric Ring Wireless Network Design

Figure 2:
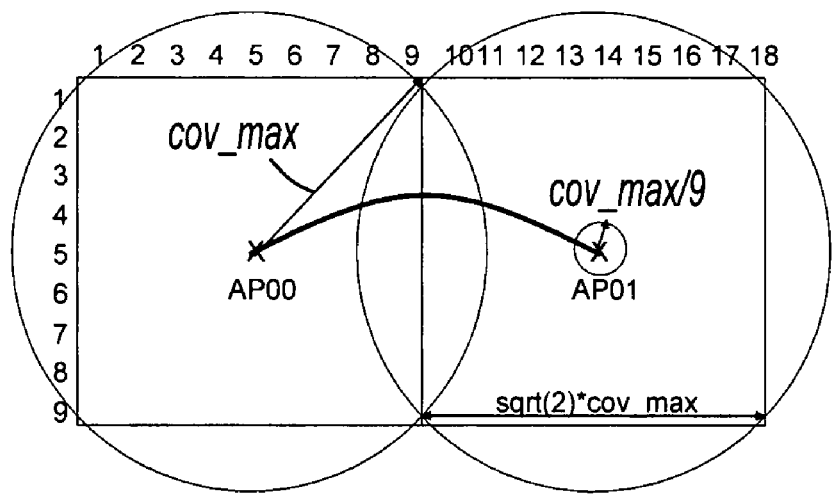

The concentric center rings approach used on a single AP (described above, FIG. 1) can be used to develop a complete adaptive WLAN system. For example, the expansion algorithm outlined above can be extended to a target area too large to be covered by a single AP. We also assume a target user distribution, that specifies the number of users across the target area, is available. Referring now to FIG. 2, let cov_max be the maximum value of cov_tran that can be sustained without impacting the value of k_ap. The target area is tiled into squares of side (cov_max*square_root(2)). An AP is placed at the center of each tile. For simplicity, we will assume that the target area can be completely tiled with an integer number of squares. This set of APs will be referred to as center_ring_0 and the n nodes named ap_00 ... ap_0(n−1). For the n APs named ap_0i (0<=i<=n−1), the transmit power is set to enable a coverage area of radius cov_max. That is, txp_ap_0i=cov_max. All the APs on center_ring_0 are powered by a common set of switches (as many as are needed). We will refer to the set of switches powering center_ring_0 as center_ring_switch_0. The set of APs in center_ring_0 represents the smallest topology-based network required to cover the target area. Consider the example target area in FIG. 2. Two APs, ap_00 at (5,5) and ap_01 at (5,14) at range cov_max are a topology-based network sufficient to cover the entire target area. For this example, n=2 and these APs together form center_ring 0.

Figure 3:
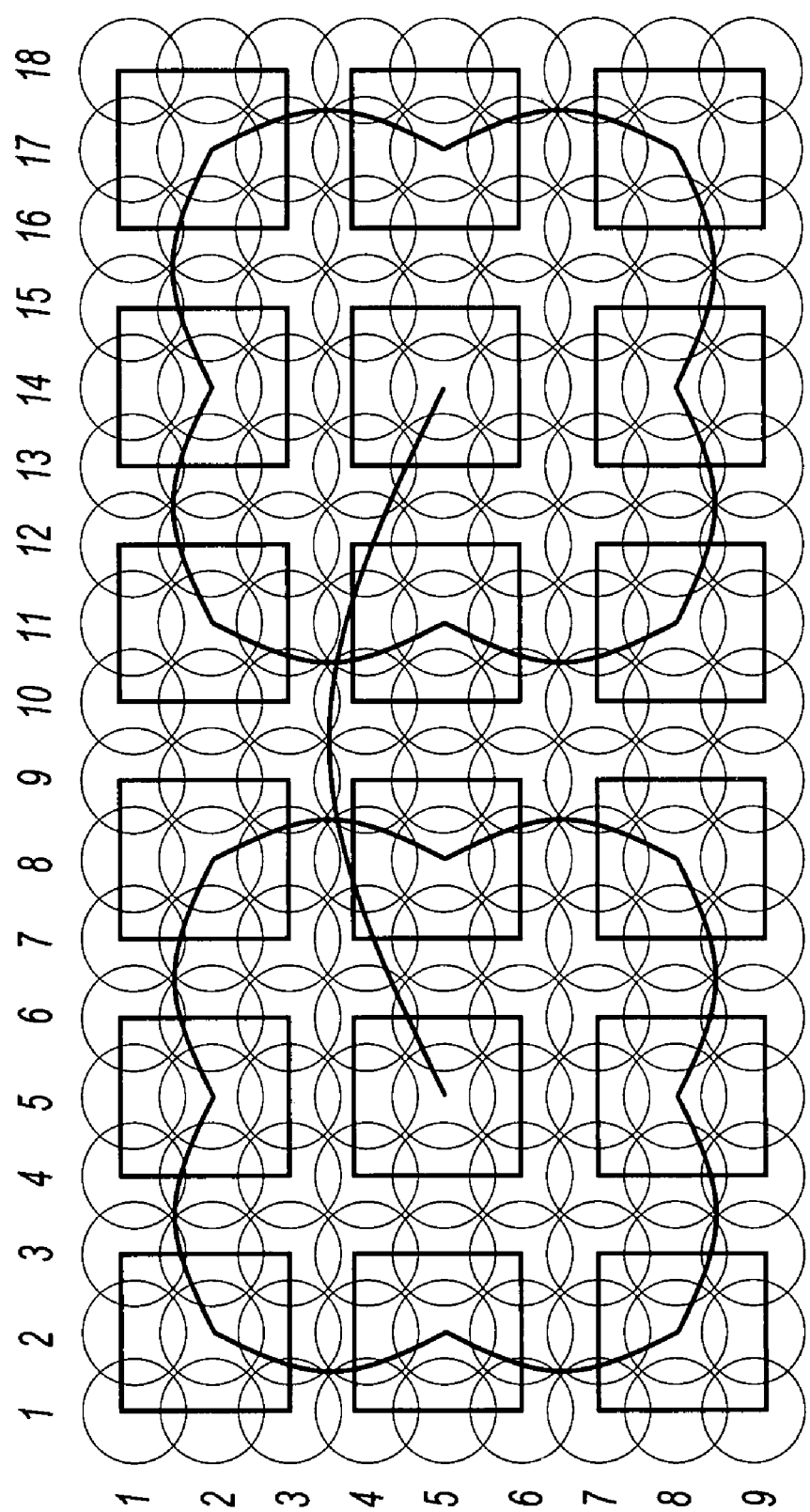
FIG. 3 shows a diagram of a concentric ring wireless network designed.

The architecture is refined from a topology-based network to a user load-based network iteratively and recursively. Initially, the APs in center_ring_0 are placed in a set, the current_set. The APs in the current_set are processed serially. Consider an AP ap_i in the current_set. The target user distribution is used to compute the user load in its coverage area. If the target density at ap_i is less than k_ap, then ap_i is removed from the current_set. If the target density exceeds k_ap, then ap_i is renamed to ap_i0 and expanded. A new concentric center ring of APs named center_ring_i with eight APs named ap_i1 through ap_i8 is placed around it. The APs are located at points in the square of side txp_ap_i*sqrt(2) as shown in FIG. 3. The coverage radii txp_ap_i0 is reset to txp_ap_i/3 and txp_ap_ij (1<=j<=8) are all set to the new value of txp_ap_i0. The new APs are added to the current_set. The process stops when the current_set is empty. The algorithm used to process the APs in the current_set is as follows.

```
Algorithm 1: Concentric Center Ring network design algorithm while(current_set){              /*Set of all APs whose load may exceed capacity*/
    for each ap_i in current_set{    /*Process access points individually and serially*/
        load = |target_dist ^ cov_area(ap_i)| /*Compute user load in the coverage area*/
        if(load < k_ap){             /*Compare user load to capacity of a single AP*/
            current_set = current_set − ap_i /*If load less than capacity, remove AP from
                                                current_set*/
        }else{       /*Else, ap_i needs to be expanded*/
            create_center_ring_i0{     /*Create a concentric center ring*/
                ap_i -> ap_i0    /*Rename ap_i to ap_i0*/
                level_center_ring_i0 = level_center_ring(ap_i) + 1;     /*Increment level*/
                length_center_ring_i0 = sqrt(2)*txp_ap_i /*Side length of square centered at
                                                ap_i */
                for (j=1,j=8,j++){    /*Create a new center ring with eight additional APs*/
                    current_set = current_set + ap_ij;    /*Place new AP in current_set*/
                    txp_ap_ij = txp_ap_i/3;               /*Set the AP's transmit power*/
                    location_ap_ij = location_center_ring_j;   /*place clockwise from top
                                                left*/
                    center_ring(ap_ij) = center_ring_i0;        /*AP powered by ring i*/
                    center_ring_switch_i0_port_j = ap_ij;     /*Power APs off one switch*/
                }
                txp_ap_i0 = txp_ap_i/3     /*Reset the tx power of ap_i0 to get one ninth the
                                                coverage area*/
            }
        }
    }
}
```

The algorithm identifies the total number of APs needed, their locations, the transmit powers required for the target coverage area, and load distribution and the switches they are grouped on. The APs are connected to the switches as follows. The APs in center_ring_i are powered by center_ring_switch_i. All the APs on one center ring are connected to ports on a common switch. If switches have more than 8 ports, center rings at the same level may be consolidated onto one switch. For example, three center rings can be consolidated on to a 24-port switch.

An example embodiment of the application of the system design algorithm is shown in FIG. 3. In some embodiments, some center ring APs may not have concentric rings of APs placed around them. The darker lines passing the circle centers show the connectivity of APs to switches. In the example of FIG. 3, the APs are connected using three levels of center rings. center_ring_0 consists of ap_000 at (5,5) and ap_100 at (5,14). center_ring_00 consists of the access points at ((2,2), (2,5), (2,8), (5,2), (5,8), (8,2), (8,5), (8,8)). center_ring_10 consists of a symmetric set of APs in the right half of the plane. There are 18 center rings at the third level. The APs in the 18 third-level center rings can be directly identified from FIG. 3. Under the lightest load conditions, the network of FIG. 3 may only have the center_ring_0 powered with a coverage area of cov_max for ap_0 and ap_1, and the coverage pattern may look like that of FIG. 2. At full load, all APs may be powered at cov_max/9 and each AP has a unique coverage area as shown in FIG. 3. At intermediate loads, various rings may be powered on and various rings may be powered off. An adaptation algorithm and an example application thereof is described below with reference to FIG. 4.

Concentric Ring Architecture Adaptation Algorithm

The adaptation algorithm is similar to the design algorithm. When there is no user load, the network is configured to be a topology-based network with only APs in center_ring_0 powered on. The transmit power is set such that the coverage area radius is cov_max, so as to cover the entire target area. The remaining APs are turned off. The only switches powered on are those powering center_ring_0. The remaining wired switches may be powered off. The no load state reduces power dissipation in both the APs and the backhaul network.

In some embodiments, the adaptation algorithm is executed periodically, and in some embodiments, the adaptation algorithm is executed in reaction to load changes. Center ring 0 is always left on, and other rings are turned on or off as needed.

When the user load increases, the network is iteratively transformed toward a user load-based network. At each AP, ap_ij0* (0* implies there could be extensions to the name, the AP can be expanded) in center_ring_0, that is powered on, the current user load is monitored. If the load at ap_ij0* exceeds its capacity (k_ap, or a preset threshold), the AP, that is center_ring_ij0 is expanded. The switch powering center_ring_ij0 and all the APs on the ring are turned on. The transmit powers are set to a third of the current transmit power of ap_ij0*. That is, txp_ap_ij0*=txp_ap_ij0*/3, txp_ap_ijk (0<=k<=7)=txp_ap_ij (the new value). (If there's no 0 in the suffix, the AP cannot be expanded—the adaptation stops there.)

When the user load decreases, the network is iteratively transformed toward a topology-based network. For every center ring_ij0 (any ring other than center_ring 0) powered on, the total load at the center AP (ap_ij0) and on the APs in the center ring (ap_ijk, 1<=k<=8), is monitored. When the total load is less than the capacity of a single AP (k_ap, or a preset threshold), the center ring is collapsed. That is, APs in center_ring_ij are powered off. The transmit power of ap_ij0 is raised to three times its value, txp_ap_ij0=3*txp_ap_ij0.

Recall that each client is always associated with the topologically closest AP that is on. In a concentric ring network, each time the network changes, the set of APs powered on changes. Even when an AP remains on through a change, its coverage area may change. Hence, for a client, the topologically closest AP that is powered on may change after a network change. For example, when center_ring_ij0 is expanded, a client may be closer to ap_ijk, than to ap_ij0 (the center AP in center_ring_ij0). Conversely, when center_ring_ij0 is collapsed, that is turned off, all the clients associated with APs in the ring have to be re-associated with the center AP, ap_ij0. The adaptation algorithm is as follows.

third level, center_ring_020 and center_ring_070 have been expanded and the APs in these rings are operated at the low transmit power cov_max/9 used at full density. Load up to the capacity of a single AP, k_ap, has been consolidated at several center APs operating at a higher transmit power. For example, the 4 clients in the right half are served from ap_1 on center_ring_0 at (5,5) operating at txp_ap_1=cov_max. The APs: ap_010 at (2,2) and ap_060 at (8,5) on center_ring_00 consolidate users by operating at transmit power cov_max/3. Only a few APs are in an on/standby state because their center rings have been expanded, but have no clients in their coverage areas. The remaining have been turned completely off. Far fewer APs are on or in a standby mode than if all APs were always on. Yet any client entering the target area can still be immediately serviced as in current networks.

Figure 4:
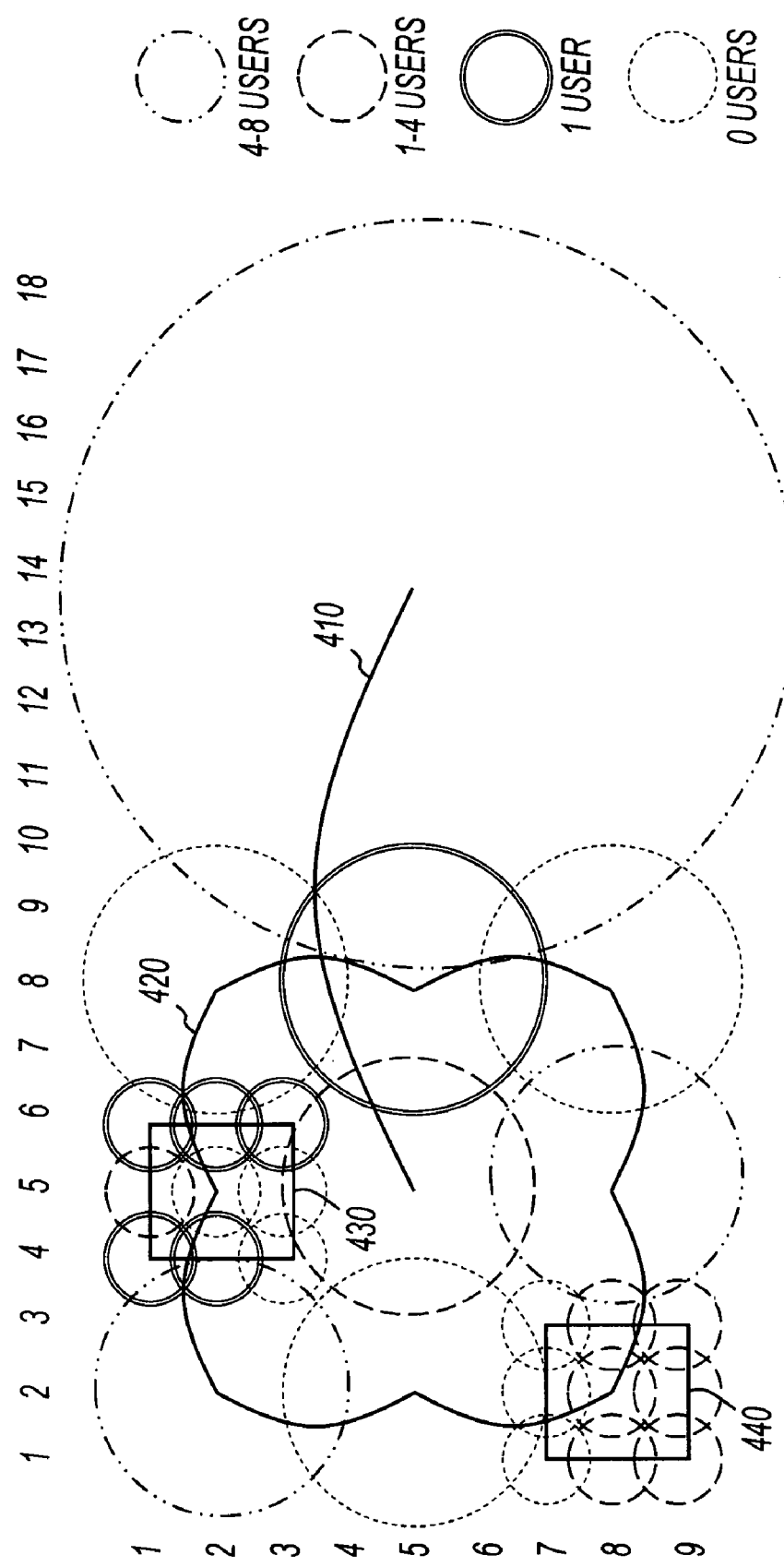
FIG. 4 shows a diagram of an adaptively operating concentric ring wireless network.

Power consumption is reduced by having some APs off. Power consumption is also reduced by having some network switches turned off. In the example of FIG. 4, switches corresponding to lines 410, 420, 430, and 440 are on, while all others may remain off. When the network changes, additional network switches may be turned on or off.

Figure 5:
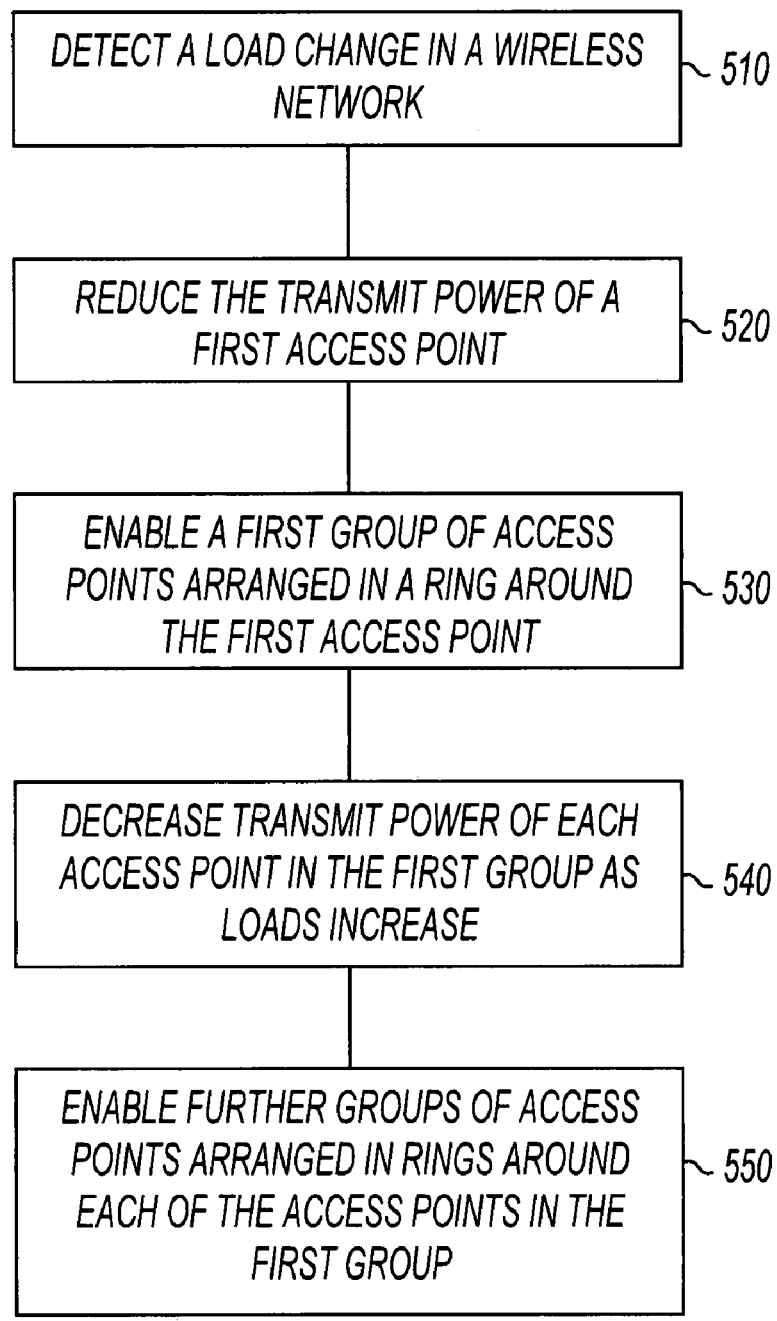
FIG. 5 shows a flowchart in accordance with various embodiments of the present invention.

FIG. 5 shows a flowchart in accordance with various embodiments of the present invention. In some embodiments, method 500, or portions thereof, is performed by an access point in a wireless network. In other embodiments, method 500 is performed by a processor within a computer. Method 500 is not limited by the particular type of apparatus performing the method. The various actions in method 500 may be performed in the order presented, or may be performed in a different order. Further, in some embodiments, some actions listed in FIG. 5 are omitted from method 500.

---

Algorithm 2: Concentric Ring network adaptation algorithm

---

```
if(load_changes){
    for each ap_i0* in on_set{                /*Process all APs*/
        if (user_load (ap_i0*)> k){           /*Compare user load to capacity*/
            power_center_ring_i{              /*If larger, expand center ring*/
                for (j=1,j=8;j++){            /*Power on new center ring*/
                    on_set = on_set + ap_ij*; /*Place new AP in current_set*/
                    txp_ap_ij* = txp_ap_i/3;  /*Set the AP's transmit power*/
                }
                txp_ap_i0* = txp_ap_i0*/3     /*Lower the txp_ap_i to lower the coverage area*/
            }
        }
    }
    for each ap_ij* in on_set{                /*Process APs not on center_ring_0*/
        ring_load = user_load(ap_i);          /*Compute total load on ap_ij's ring*/
        for (j=0;j=8;j++){
            ring_load += user_load (ap_ij*);  /*Add load on all APs and center AP*/
        }
        If (ring_load < k){                   /*Compare ring load to single AP capacity*/
            power_off_center_ring_i0{         /*If smaller, collapse center ring*/
                for(j=1;j=8;j++){
                    on_set = on_set – ap_ij*  /*Remove the APs from the on set*/
                }
                txp_ap_i0* = txp_ap_i0*3;     /*Raise the txp_ap_i to enlarge the coverage area*/
            }
        }
    }
    for (all clients){
        associate_ap = nearest_ap_on(client); /*Associate every client with the nearest AP that is ON*/
    }
}
```

---

An example embodiment of the application of the adaptation algorithm is shown in FIG. 4. For the example user load environment of FIG. 4, center ring expansion is necessary only in the left half of the plane. Only a few center_rings at the Method 500 is shown beginning with block 510 in which a load change in a network is detected. The load change may be detected when a user enters an AP's coverage area. If the number of users exceeds a threshold for that AP, then the wireless network may adaptively change by turning on more APs as described herein.

At 520, the transmit power of a first access point is reduced, and at 530, a first group of APs is enabled. This first group of APs have centers that form a concentric ring with the first access point. The operation of 520 and 530 is illustrated in FIG. 1 where the outer ring of APs 110 corresponds to the first group of APs in 530.

At 540, the transmit power of each of the APs in the first group is decreased as network load increases, and at 550, further groups of APs are enabled in concentric rings around the APs in the first group. The actions of 540 and 550 are an iterative application of the concentric ring architecture. FIG. 4 shows the result of applying the actions of 540 and 550 to various portions of the wireless network.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A wireless network comprising:
   a first access point having a variable coverage area;
   a first group of access points forming a concentric ring around the first access point;
   wherein the variable coverage area of the first access point can be configured to either overlap or not overlap coverage areas of the first group of access points; and
   a second group of access points forming concentric rings of coverage around each access point within the first group of access points such that the concentric rings are turned off or on based on load of the wireless network,
   wherein at light load, one or more of the concentric rings are turned off,
   and the second group of access points are left on when supporting large coverage areas; and
   wherein each access point within the first group has a variable coverage area to overlap or not overlap coverage areas of the second group;
   wherein the following regarding the access points are identified: number of access points, locations of access points, transmit power of access points, and load distribution of switches of the access points.

2. The wireless network of claim 1 further comprising a first switch coupling the first group of access points.

3. The wireless network of claim 1 further comprising a second switch coupling the second group of access points.

4. The wireless network of claim 1 further comprising a second access point having a variable coverage area, and a third group of access points forming a concentric ring around the second access point.

5. The wireless network of claim 4 further comprising a first network switch coupled between the first and second access points.

6. The wireless network of claim 5 further comprising second network switch coupling the first group and third group of access points.

7. A method comprising:
   detecting a load change in a wireless network;
   decreasing a transmit power of a first access point, if the load change is detected as increased;
   enabling a first group of access points arranged in a ring around the first access point; and
   enabling further groups of access points arranged in concentric rings of coverage around each of the access points in the first group of access points when the load change is detected as increased;
   wherein the following regarding the access points are identified: number of access points, locations of access points, transmit power of access points, and load distribution of switches of the access points.

8. The method of claim 7 wherein detecting a load change comprises detecting an increase in the number of wireless users.

9. The method of claim 8 wherein detecting a load change further comprises determining that the number of wireless users has increased beyond a threshold.

10. The method of claim 8 further comprising:
    decreasing transmit power of each access point in the first group of access points as loads increase.

11. The method of claim 7 further comprising turning on a network switch coupled to the first group of access points.

* * * * *